(12) United States Patent
Choi et al.

(10) Patent No.: US 11,636,802 B2
(45) Date of Patent: Apr. 25, 2023

(54) LED DISPLAY DRIVING DEVICE AND LED DISPLAY DEVICE

(71) Applicant: LX Semicon Co., Ltd., Daejeon (KR)

(72) Inventors: Jin Ho Choi, Daejeon (KR); Jang Su Kim, Daejeon (KR); Ji Hwan Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/545,981

(22) Filed: Dec. 8, 2021

(65) Prior Publication Data

US 2022/0189383 A1    Jun. 16, 2022

(30) Foreign Application Priority Data

Dec. 14, 2020   (KR) .......................... 10-2020-0174616

(51) Int. Cl.
*G09G 3/32* (2016.01)
*H05B 45/325* (2020.01)

(52) U.S. Cl.
CPC ............. *G09G 3/32* (2013.01); *H05B 45/325* (2020.01); *G09G 2310/0272* (2013.01); *G09G 2320/064* (2013.01)

(58) Field of Classification Search
CPC .. G09G 3/32; G09G 2320/064; G09G 3/2092; G09G 2300/08; G09G 2360/16; G09G 3/2022; G09G 2300/0439; G09G 2310/0272; H05B 45/325; Y02B 20/40
See application file for complete search history.

(56) References Cited

U.S. PATENT DOCUMENTS

| | | | |
|---|---|---|---|
| 10,395,584 B2 | 8/2019 | Nadershahi | |
| 10,440,786 B1 | 10/2019 | Stoegner et al. | |
| 10,565,928 B2 | 2/2020 | Li et al. | |
| 11,132,940 B2 | 9/2021 | Yen et al. | |
| 2008/0198117 A1* | 8/2008 | Kumakura | G09G 3/3648 345/89 |
| 2011/0074799 A1* | 3/2011 | Wu | G09G 3/2025 345/532 |
| 2018/0144676 A1* | 5/2018 | Nadershahi | G09G 3/2014 |
| 2020/0312233 A1 | 10/2020 | Yen et al. | |

FOREIGN PATENT DOCUMENTS

| | | |
|---|---|---|
| KR | 10-2019-0086522 A | 7/2019 |
| KR | 10-2019-0129007 A | 11/2019 |
| KR | 10-2020-0116063 A | 10/2020 |

* cited by examiner

*Primary Examiner* — Muhammad N Edun
(74) *Attorney, Agent, or Firm* — Rothwell, Figg, Ernst & Manbeck, P.C.

(57) ABSTRACT

An embodiment relates to a technique for driving an LED display. In a method of controlling grayscale of pixels dividedly by N subframes (N is a natural number of 2 or greater), a pulse width modulation (PWM) control value of each subframe may be calculated by a precalculator disposed at a front end of latches, thereby simplifying a circuit.

14 Claims, 6 Drawing Sheets

11,636,802 B2

LED DISPLAY DRIVING DEVICE AND LED DISPLAY DEVICE

CROSS REFERENCE TO RELATED APPLICATION

This application claims priority from Republic of Korea Patent Application No. 10-2020-0174616, filed on Dec. 14, 2020, which is hereby incorporated by reference in its entirety.

BACKGROUND

1. Field of Technology

The present embodiment relates to an LED display driving technology.

2. Description of the Prior Art

With advancement in digitalization, various display devices capable of visualizing information have been developed. A liquid crystal display (LCD), an organic light emitting diode (OLED) display device, a plasma display panel (PDP) display device, and the like have recently been developed or are being developed. These display devices are evolving to properly display high-resolution images.

However, the foregoing display devices are favorable to achieve high resolution but are difficult to be made in a large size. For example, about 80-inch (approximately 2 m) and 100-inch (approximately 2.5 m) large-sized OLED display devices have been developed so far, but an OLED display device is not suitable to be made in a large size with a width exceeding 10 m.

Recently, as a method for achieving a large-sized display device, there is a growing interest in a light emitting diode (LED) display device. In an LED display device technology, one large panel may be formed by disposing as many modularized LED pixels as needed. Further, in the LED display device technology, a single large panel structure may be formed by disposing as many unit panels including a plurality of LED pixels as needed. Accordingly, in the LED display device technology, it is possible to easily configure a large display device by expansively disposing LED pixels as needed.

An LED display device is favorable not only in achieving a large size but also in diversifying a panel size. In the LED display device technology, it is possible to variously adjust horizontal and vertical sizes according to suitable arrangements of LED pixels.

A plurality of driving devices is disposed in an LED display device, and there is a demand for a decrease in manufacturing costs and miniaturization of a driving device. As an LED display device is made in a large size, the number of driving devices increases, and the demand for a decrease in manufacturing costs and miniaturization further increases.

SUMMARY OF THE INVENTION

With this background, an aspect of an embodiment is to provide a technique for simplifying a circuit of an LED display driving device.

To achieve the foregoing aspect, an embodiment provides an LED display driving device that controls grayscale of pixels dividedly by N subframes (N is a natural number of 2 or greater), the LED display driving device including: a memory configured to store grayscale values of the pixels; a plurality of channel circuits configured to perform on pulse width modulation (PWM) control on power supplied to each pixel according to a PWM control value; and a precalculator configured to read K grayscale values at a time (K is a natural number), to calculate PWM control values in one subframe from the grayscale values, and to forward the PWM control values to the channel circuits.

The precalculator may include K sub-precalculators, and each sub-precalculator may sequentially calculate one PWM control value from one grayscale value and may forward the one PWM control value to one channel circuit.

The precalculator may store the PWM control values in latches, and the channel circuits may read the PWM control values from the latches.

The PWM control value may include a common PWM value calculated according to an upper bit value and an additional PWM value calculated according to a lower bit value, and the precalculator may determine a quotient of the grayscale values divided by N as the upper bit value, may determine a remainder of the grayscale values divided by N as the lower bit value, may set the additional PWM value to 1 in as many subframes as the lower bit value among the subframes, and may set the additional PWM value to 0 in remaining subframes.

Another embodiment provides a light emitting diode (LED) display device including: a data processing device configured to transmit image data including grayscale values of a plurality of pixels, each comprising an LED; and a driving device configured to control grayscale of the pixels dividedly by N subframes (N is a natural number of 2 or greater) and to include a memory configured to store the grayscale values of the pixels, a plurality of channel circuits configured to perform on pulse width modulation (PWM) control on power supplied to each pixel according to a PWM control value, and a precalculator configured to read K grayscale values at a time (K is a natural number), to calculate PWM control values in one subframe from the grayscale values, and to forward the PWM control values to the channel circuits.

The data processing device may transmit option information including the number of the subframes to the driving device.

The data processing device may transmit a communication clock along with the image data to the driving device, and the driving device may generate an internal clock by increasing a frequency of the communication clock by M (M is a natural number of 2 or greater) times.

As described above, according to an embodiment, it is possible to simplify a circuit of an LED display driving device and to reduce manufacture costs.

DETAILED DESCRIPTION OF THE EXEMPLARY EMBODIMENTS

Figure 1:
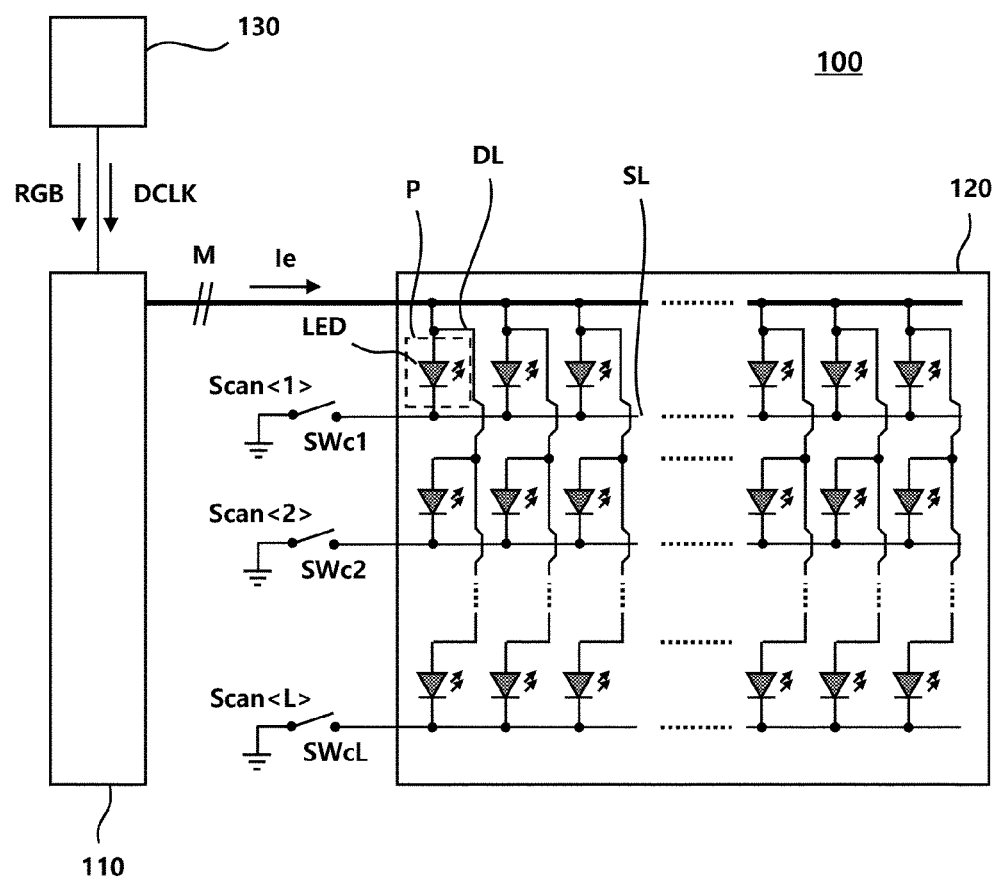
FIG. 1 illustrates the configuration of an LED display device according to an embodiment.

FIG. 1 illustrates the configuration of an LED display device according to an embodiment.

Referring to FIG. 1, the LED display device 100 may include a driving device 110, a panel 120, and a data processing device 130.

On the panel 120, a plurality of pixels P may be disposed in a first direction (e.g., a horizontal direction in FIG. 1) and a second direction (e.g., a vertical direction in FIG. 1) to form a matrix.

At least one light emitting diode (LED) may be disposed in each pixel P, and the brightness of the pixel P may be determined depending on the brightness of the LED.

A driving line DL and a scan line SL may be disposed on the panel 120, the driving line DL may connect one sides of pixels in the second direction, and the scan line SL may connect other sides of pixels in the first direction. For example, an anode of an LED disposed in a pixel P may be electrically connected to the driving line DL, and a cathode of the LED may be electrically connected to the scan line SL. Although an example illustrated in FIG. 1 is referred to as a common cathode structure in that cathodes of LEDs are commonly connected, the embodiment is not limited to this structure.

Scan switches SWc1, SWc2, . . . , and SWcN may be disposed in respective scan lines SL, and a scan line SL through which a driving current Ie is supplied may be determined depending on whether the scan switches SWc1, SWc2, . . . , and SWcN are open or closed.

Figure 2:
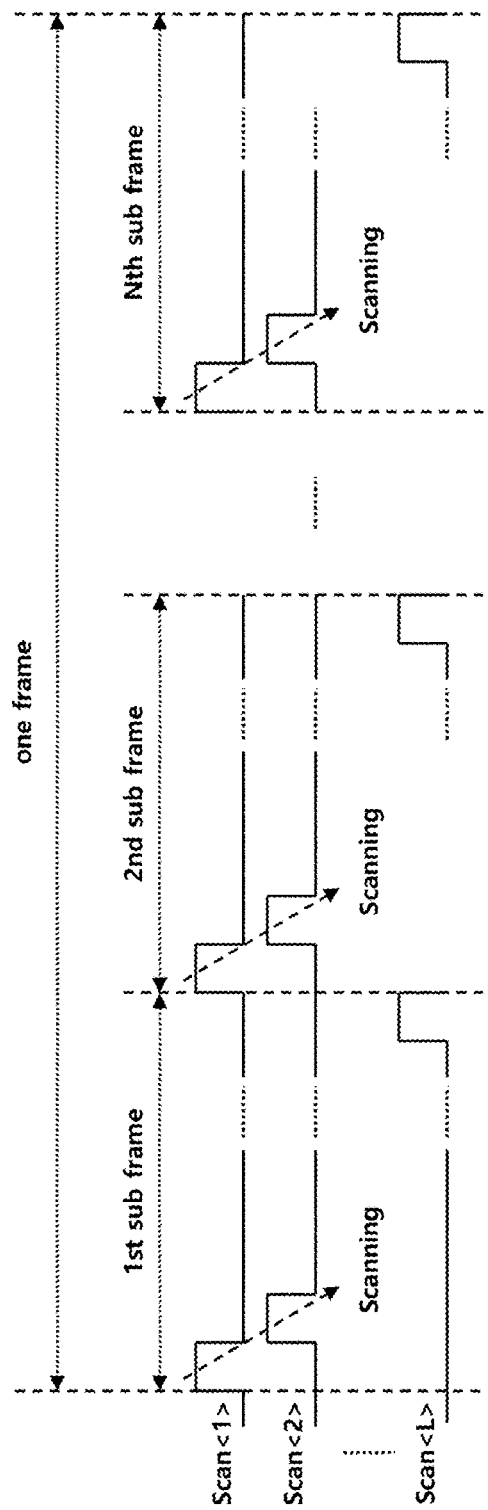
FIG. 2 illustrates the waveform of a scan signal in an LED display device according to an embodiment.

FIG. 2 illustrates the waveform of a scan signal in an LED display device according to an embodiment.

Referring to FIG. 1 and FIG. 2 together, one frame may include N (N is a natural number) subframes, and scan signals Scan<1>, Scan<2>, . . . , and Scan<N> may be sequentially supplied by the respective scan switches SWc1, SWc2, . . . , and SWcN in each subframe. According to the scan signals Scan<1>, Scan<2>, . . . , and Scan<N>, the driving current Ie may be sequentially supplied to a first scan line, a second scan line, . . . , an Nth scan line.

The scan lines SL may be connected to a low-voltage part, such as a ground, in the LED display device 100. The scan switches SWc1, SWc2, . . . , SWcN may be formed on the panel 120 or on a separate substrate, or may be formed in the driving device 110 according to an embodiment.

The scan signals Scan<1>, Scan<2>, . . . , Scan<N> may be supplied by the driving device 110 or may be supplied by a separate control device.

The brightness of the LED disposed in each pixel P may be determined according to the amount of driving power supplied within a predetermined time. The LED may be driven by pulse width modulation (PWM), and the brightness may be determined according to the ratio of turn-on time in PWM control time. When the LED is turned on by the driving current Ie, a forward voltage may be formed in the LED, the amount of driving power supplied to the LED may be obtained by accumulating the product of the forward voltage and the driving current Ie for turn-on time within the PWM control time, and the brightness of the LED may be determined according to the amount of driving power. Assuming that the forward voltage of the LED and the driving current Ie are fixed parameters, the amount of driving power may be considered as a value proportional to the turn-on time in the PWM control time. According to this principle, the driving device 110 may control the turn-on time in the PWM control time, thereby controlling the brightness of the LED and the brightness of the pixel P.

The driving device 110 may include M (M is a natural number) channel circuits connected to the driving line DL, and each channel circuit may supply the driving current Ie to each pixel P.

The driving device 110 may perform PWM control on each pixel P according to image data RGB received from the data processing device 130. The image data RGB may include a grayscale value for each pixel P. The data processing device 130 may transmit the image data RGB together with a communication clock DCLK to the driving device 110. The driving device 110 may receive the image data RGB according to the communication clock DCLK and may obtain the grayscale value for each pixel P from the image data RGB.

The driving device 110 may determine PWM control time for each pixel P according to the grayscale value and may perform PWM control on each pixel P.

The driving device 110 may perform PWM control on each pixel P once in one frame, and may perform PWM control on each pixel P once in each subframe by dividing one frame into N subframes as illustrated in FIG. 2.

When PWM control is performed on each pixel P once in one frame, the driving device 110 may convert the grayscale value into a PWM control value as it is and may perform PWM control on each pixel P according to the PWM control value. When one frame is divided into N subframes, the driving device 110 may divide and allocate the grayscale value for N subframes and may determine a PWM control value according to an allocated value in each subframe. Then, the driving device 110 may perform PWM control on each pixel P in each subframe according to the determined PWM control value.

A conventional driving device includes a calculator for allocating a grayscale value to N subframes in each channel circuit. For example, when the driving device includes M channel circuits, the driving device includes M calculators. Due to a large number of calculators, the conventional driving device includes a large number of circuit elements and entails high manufacturing costs.

The driving device according to an embodiment may include a precalculator disposed at a front end of the channel circuits and may calculate a PWM control value through the precalculator. This structure of the driving device according to the embodiment makes it possible to reduce the number of calculators, to simplify the circuits, and to lower manufacturing costs.

Figure 3:
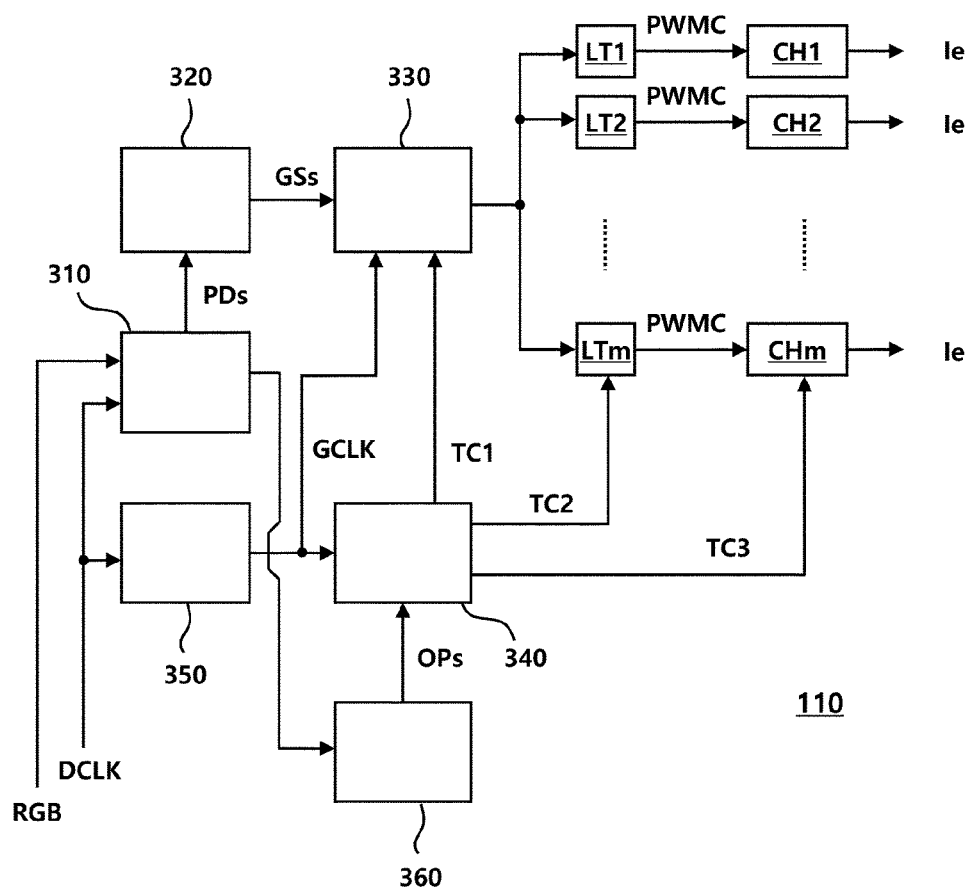
FIG. 3 illustrates the configuration of a driving device according to an embodiment.

FIG. 3 illustrates the configuration of a driving device according to an embodiment.

Referring to FIG. 3, the driving device 110 may include a communication circuit 310, a memory 320, a precalculator 330, a controller 340, a clock multiplier 350, a register circuit 360, latches LT1 to LTm, and a plurality of channel circuits CH1 to CHm.

The communication circuit 310 may receive image data RGB along with a communication clock DCLK from a data processing device. The communication circuit 310 may read the image data RGB bit by bit according to the communication clock DCLK and may split the image data RGB in pixel units to generate pieces of pixel data PDs. The communication circuit 310 may store the pieces of pixel data PDs in the memory 320.

The communication circuit 310 may further receive option information from a data processing device in addition to the image data RGB. The communication circuit 310 may extract option values OPs from the option information and may store the option values OPs in the register circuit 360.

The memory 320 may include two areas alternated as a reading area and a writing area. In one frame, a first area of the two areas may be used as the reading area, and a second area may be used as the writing area. In a frame following the one frame, the first area may be used as the writing area, and the second area may be used as the reading area.

The communication circuit 310 may store the pieces of pixel data PDs in the writing area. The precalculator 330 may read the pieces of pixel data PDs from the reading area of the memory 320.

The pixel data PD may include a grayscale value, and the precalculator 330 may sequentially read K (K is a natural number) grayscale values from the pieces of pixel data PDs stored in the memory 320. When the number of channel circuits CH1 to CHm is M, K may be less than M.

The precalculator 330 may read the grayscale values for K pixels and may calculate PWM control values for the K pixels in one subframe, for example, a current subframe or a subsequent subframe, using the grayscale values. The precalculator 330 may transmit the PWM control values to channel circuits corresponding to the K pixels, respectively.

The precalculator 330 may sequentially store K PWM control values at a time in the latches LT1 to LTm. After all of the M latches LT1 to LTm store the PWM control values, the PWM control values stored in the latches LT1 to LTm may be transmitted to the channel circuits CH1 to CHm according to a control signal of the controller 340, for example, a second control signal TC2.

The channel circuits CH1 to CHm may perform PWM control of power Ie supplied to each pixel according to the PWM control values. In PWM, a turn-on time may be determined by comparing a PWM control value and a count value. The controller 340 may transmit a start signal and a count value to each channel circuit CH1 to CHm, and each channel circuit CH1 to CHm may supply the power Ie to each pixel according to the start signal, and may stop supplying the power to each pixel when the PWM control value and the count value are equal or the count value is greater than the PWM control value.

The controller 340 may control the operation timing of each component of the driving device 110 and may provide values necessary for control to each component. For example, the controller 340 may supply a first control signal TC1 to the precalculator, may supply the second control signal TC2 to the latches LT1 to LTm, and may supply a third control signal TC3 to the channel circuits CH1 to CHm.

The first control signal TC1 may include a first count value and may include signals for controlling the operation timing of the precalculator 330. The second control signal TC2 may include signals for controlling the operation timing of the latches LT1 to LTm, and the third control signal TC3 may include a second count value and signals for controlling the operation timing of the channel circuits CH1 to CHn.

The controller 340 may read the option values OPs from the register circuit 360 and may forward the option values OPs to each component.

The clock multiplier 350 may generate an internal clock GCLK by increasing the frequency of the communication clock DCLK by R (R is a natural number of 2 or greater) times. The clock multiplier 350 may forward the internal clock GCLK as an operation clock of the precalculator 330 and the controller 340. Since the internal clock GCLK has a high frequency, the operating speeds of the precalculator 330 and the controller 340 using this clock may be increased.

Figure 4:
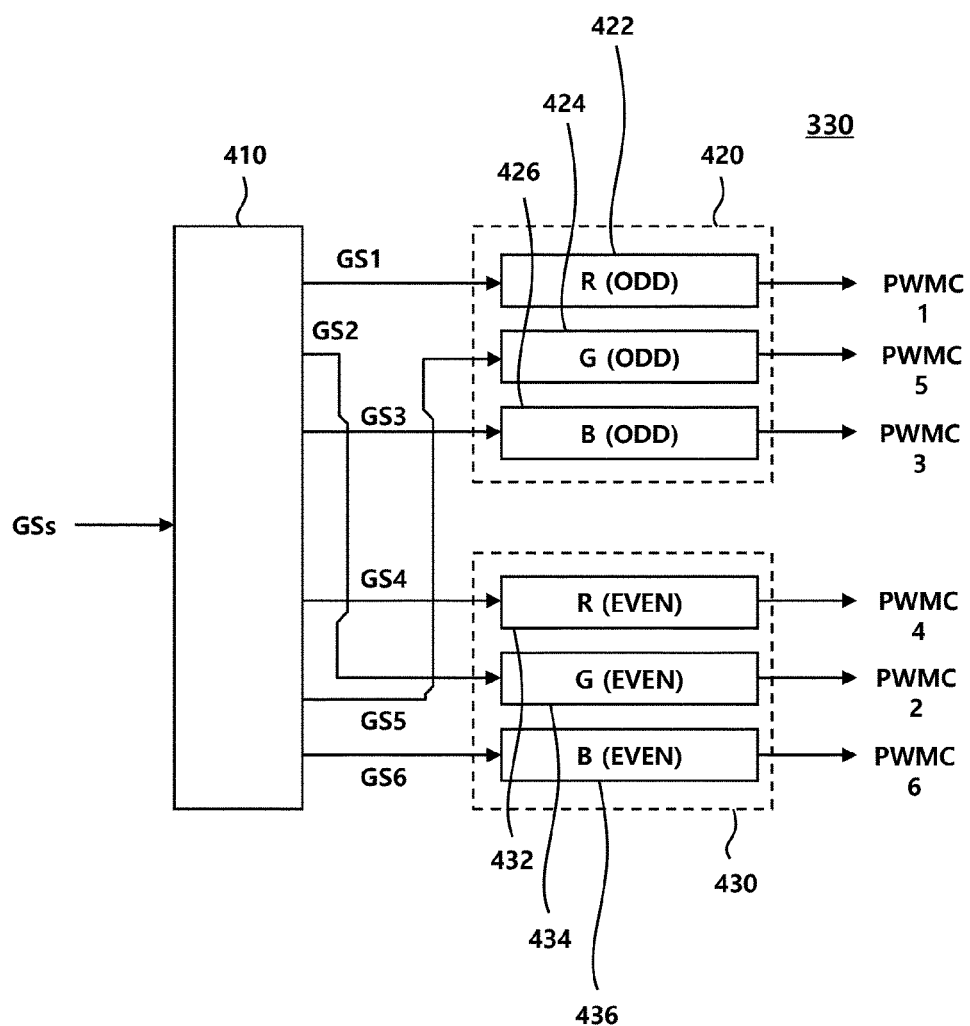
FIG. 4 illustrates the configuration of a precalculator according to an embodiment.

FIG. 4 illustrates the configuration of a precalculator according to an embodiment.

Referring to FIG. 4, the precalculator 330 may include a distributor 410 and sub-precalculators 422, 424, 426, 432, 434, and 436.

The distributor 410 may distribute read grayscale values GSs to the sub-precalculators 422, 424, 426, 432, 434, and 436.

The sub-precalculators 422, 424, 426, 432, 434, and 436 may be divided according to the color of each pixel or according to the positional order of each pixel. For example, the sub-precalculators 422, 424, 426, 432, 434, and 436 may be divided into odd-numbered precalculators 420 that calculate PWM control values for odd-numbered channel circuits and even-numbered precalculators 430 that calculate PWM control values for even-numbered channel circuits. The odd-numbered precalculators 420 may be divided into an R-odd-numbered precalculator 422 for a red pixel, a G-odd-numbered precalculator 424 for a green pixel, and a B-odd-numbered precalculator 426 for a blue pixel. The even-numbered precalculators 430 may be divided into an R-even-numbered precalculator 432 for the red pixel, a G-even-numbered precalculator 434 for the green pixel, and a B-even-numbered precalculator 436 for the blue pixel.

Since the grayscale values are forwarded with R, G, and B forming one set, the distributor 410 may distribute a grayscale value GS2 for the G pixel corresponding to an even-numbered channel circuit in a first set to the G-even-numbered precalculator 434 and may distribute a grayscale value GS5 for the G pixel corresponding to an odd-numbered channel circuit in a second set to the G-odd-numbered precalculator 424. Further, the distributor 410 may distribute a grayscale value GS1 for the R pixel in the first set to the R-odd-numbered precalculator 422, may distribute a grayscale value GS3 for the B pixel in the first set to the B-odd-numbered precalculator 426, may distribute a grayscale value GS4 for the R pixel in the second set to the R-even-numbered precalculator 432, and may distribute a grayscale value GS6 for the B pixel in the second set to the B-even-numbered precalculator 436.

The sub-precalculators 422, 424, 426, 432, 434, and 436 may calculate and output PWM control values PWMC1 to PWMC6 according to the grayscale values GS1 to GS6.

Figure 5:
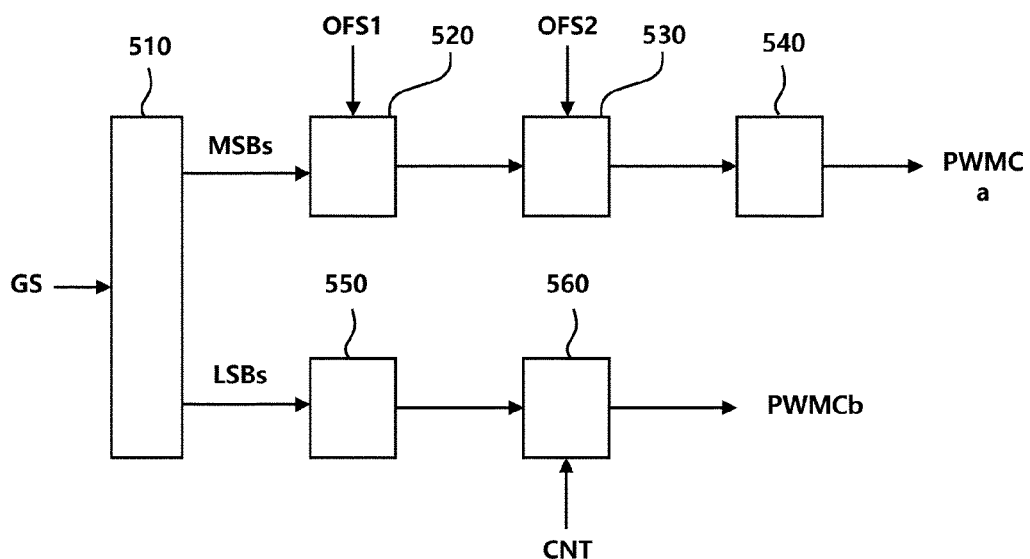
FIG. 5 illustrates the configuration of a sub-precalculator according to an embodiment.

FIG. 5 illustrates the configuration of a sub-precalculator according to an embodiment.

Referring to FIG. 5, the sub-precalculator 500 may include an upper-lower bit separator 510, a first offset processing circuit 520, a second offset processing circuit 530, a minimum PWM control circuit 540, a first half-second half separator 550, and an additional PWM value determination circuit 560.

The upper-lower bit separator 510 may divide a grayscale value GS into an upper bit value (most significant bits: MSBs) and a lower bit value (least significant bits: LSBs). For example, the upper-lower bit separator 510 may determine the quotient of the grayscale value GS divided by N as the upper bit value MSBs and may determine the remainder of the grayscale value GS divided by N as the lower bit value LSBs. Since N generally has a value of $2^S$ (S is a natural number), the upper-lower bit separator 510 may move a bit of the grayscale value GS, thereby determining the upper bit value MSBs or the lower bit value LSBs.

The upper bit value MSBs is a basic value for determining a common PWM value PWMCa that is commonly output every subframe, and the lower bit value LSBs is a basic value for determining an additional PWM value PWMCb that is added to specific subframes. The common PWM value PWMCa and the additional PWM value PWMCb may form one PWM value.

The sub-precalculator 500 may revise the grayscale value GS by adjusting the common PWM value PWMCa.

For example, the sub-precalculator 500 may increase the common PWM value PWMCa by a first offset value OFS1 when the grayscale value GS is for a pixel in a first scan line. Specifically, when the grayscale value GS is for the pixel in the first scan line, the first offset processing circuit 520 may output a value obtained by adding the first offset value OFS1 to the upper bit value MSBs.

When the common PWM value PWMCa is less than or equal to a reference value, the sub-precalculator 500 may increase the common PWM value PWMCa by a second offset value OFS2. Specifically, the second offset processing circuit 520 may compare an output value of the first offset processing circuit 510 with the reference value, and may output a value obtained by adding the second offset value OFS2 to the output value of the first offset processing circuit 510 when the output value of the first offset processing circuit 510 is less than or equal to the reference value.

When the common PWM value PWMCa is less than or equal to a minimum value, the sub-precalculator 500 may set a minimum flag value to 1 and may include the minimum flag value in a PWM control value. Specifically, the minimum PWM control circuit 540 may compare an output value of the second offset processing circuit 520 with the minimum value, and may set the minimum flag value is set to 1 when the output value of the second offset processing circuit 520 is less than or equal to the minimum value. The minimum flag value may be used in an analog circuit of a channel circuit, and the channel circuit may solve a problem that occurs when the common PWM value PWMCa is too small through the minimum flag value.

The lower bit value LSBs may be equally distributed to each subframe through the additional PWM value PWMCb. However, since the lower bit value LSBs has a value less than the number N of subframes, the additional PWM value PWMCb may be set to 1 for some subframes, and the additional PWM value PWMCb may be set to 0 for remaining subframes.

The first half-second half separator 550 may separate the lower bit value LSBs into a first-half value and a second-half value. When the lower bit value LSBs is an even number, the first half-second half separator 550 may generate the first-half value and the second-half value to be the same. When the lower bit value LSBs is an odd number, the first half-second half separator 550 may generate the first-half value or the second-half value to be larger by one.

The additional PWM value determination circuit 560 may compare the lower bit value LSBs with the count value CNT, and may the additional PWM value PWMCb to 1 when the count value CNT is less than the lower bit value LSBs or is equal to the lower bit value LSBs. Here, the count value CNT may start from 0 or 1 and may increase by one every subframe.

When the subframes are divided into a first half and a second half, in the first half, the additional PWM value determination circuit 560 may compare the first-half value and the count value CNT, and may set the additional PWM value PWMCb to 1 when the count value CNT is less than the first-half value or is equal to the first-half value. In the second half, the additional PWM value determination circuit 560 may compare the second-half value and the count value CNT, and may set the additional PWM value PWMCb to 1 when the count value CNT is less than the second-half value or is equal to the second-half value.

Figure 6:
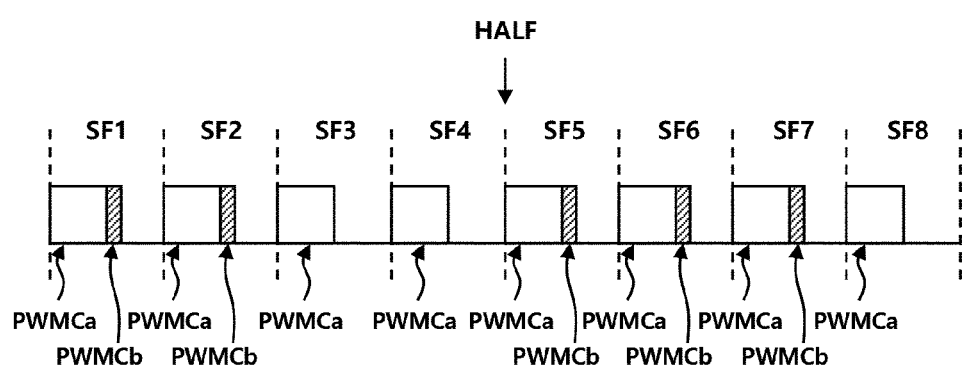
FIG. 6 illustrates an example of a PWM control waveform according to an embodiment.

FIG. 6 illustrates an example of a PWM control waveform according to an embodiment.

Referring to FIG. 6, one frame may be divided into a plurality of subframes SF1 to SF8. The plurality of subframes SF1 to SF8 may further divided into a first half SF1 to SF4 and a second half SF5 and SF8.

Channel circuits may supply power to pixels for a time corresponding to a common PWM control value PWMCa in all of the subframes SF1 to SF8 (high-level periods in FIG. 6).

The channel circuits may additionally supply power to the pixels for a time corresponding to an additional PWM value PWMCb in subframes SF1, SF2, SF5, SF6, and SF7 in which the additional PWM value PWMCb is set to 1 (slashed sections in FIG. 6)

In a driving device according to an embodiment, since a precalculator performs calculation for image correction and calculation for the PWM control value at a front end of latches in a centralized manner, a separate calculator does not need disposing in each channel circuit. Accordingly, it is possible to simplify a circuit of the driving device and to reduce manufacturing costs.

To increase a calculation speed in a centralized calculation method, the driving device according to an embodiment may further include various additional components.

For example, a memory includes two areas, and the functions of the respective areas may be alternated as a reading area and a writing area. This configuration enables the driving device to reduce reading/writing time for the memory and to secure more calculation time by that time.

In another example, the driving device may include a plurality of sub-precalculators disposed in the precalculator and may calculate K PWM control values at the same time. This configuration enables the driving device to increase the calculation speed by K times.

In another example, the driving device may generate an internal clock by multiplying a communication clock and may use the internal clock as an operation clock of the precalculator. According to this configuration, the calculation speed of the driving device may be increased.

The driving device according to the embodiment may easily apply an option through centralized calculation. When a calculator is disposed in the channel circuits, option values for calculation for image correction or a PWM control value need to be transmitted to the individual channel circuits. However, the driving device according to the embodiment employs the centralized calculation method and thus may receive and process option values in one component.

There may be various option values. The number of subframes may be set as an option value, a PWM resolution may also be set as an option value, and the length of a blank period between frames, the length of a blank period between subframes, and the length of a blank period between scan lines may also be set as optional values.

The precalculators may transmit main information identified in a process of calculating the PWM control value to the channel circuits in the form of a flag.

For example, when the common PWM control value is less than or equal to a minimum value, the precalculator may set a minimum PWM flag to 1 and may transmit the minimum PWM flag to the channel circuits. The channel circuit may use the minimum PWM flag in an analog circuit, thereby preventing a problem caused by using a PWM control value less than the minimum value.

When a grayscale value is 0, the precalculator may set a grayscale value zero flag to 1 and may transmit the grayscale value zero flag to the channel circuits. The channel circuits may first supply power to pixels according to a start signal and may then stop supplying the power by comparing a count value with a PWM control value. However, when the grayscale value is 0, the channel circuits may not first supply power to the pixels even though recognizing the start signal.

As described above, according to the embodiment, it is possible to simplify a circuit of an LED display driving device and to reduce manufacturing costs.

What is claimed is:

1. An LED (light emitting diode) display driving device that controls grayscale of a pixel by distributing the grayscale to N subframes (N is a natural number of 2 or greater), the LED display driving device comprising:
    a memory configured to store grayscale values of pixels;
    a plurality of channel circuits, each configured to perform pulse width modulation (PWM) control on power supplied to each pixel according to a PWM control value; and
    a precalculator configured to read K grayscale values at a time (K is a natural number), to calculate PWM control values in one subframe from the grayscale values, and to forward the PWM control values to the channel circuits,
    wherein the precalculator comprises K sub-precalculators and each sub-precalculator calculates one PWM control value from one grayscale value and forwards the one PWM control value to one channel circuit.

2. The LED display driving device of claim 1, wherein the sub-precalculators comprise an odd-number precalculator configured to calculate the PWM control values for odd-numbered channel circuits and an even-number precalculator configured to calculate the PWM control values for even-numbered channel circuits.

3. The LED display driving device of claim 1, wherein the precalculator further comprises a distributor configured to distribute the grayscale values, read from the memory, to the sub-precalculators.

4. The LED display driving device of claim 1, wherein the sub-precalculators are divided according to a color of each pixel or a positional order of each pixel.

5. The LED display driving device of claim 1, wherein the precalculator stores the PWM control values in latches and the channel circuits read the PWM control values from the latches.

6. The LED display driving device of claim 1, wherein the memory comprises two areas, each used alternately as a reading area and a writing area, wherein, when one area is used as a reading area, the other area is used as a writing area and vice versa, and the precalculator reads the grayscale values from the reading area.

7. The LED display driving device of claim 1, further comprising:
    a communication circuit configured to receive image data comprising the grayscale values and a communication clock; and
    a clock multiplier configured to generate an internal clock by increasing the frequency of the communication clock by R (R is a natural number of 2 or greater) times and to forward the internal clock to the precalculator.

8. The LED display driving device of claim 1, wherein the PWM control value comprises a common PWM value calculated according to an upper bit value and an additional PWM value calculated according to a lower bit value, and
    the precalculator determines a quotient obtained by dividing a grayscale value by N as the upper bit value, determines a remainder obtained by dividing the grayscale values by N as the lower bit value, sets the additional PWM value to 1 in as many subframes as the lower bit value among the subframes, and sets the additional PWM value to 0 in remaining subframes.

9. The LED display driving device of claim 8, wherein, when the grayscale value is for a pixel in a first line, the precalculator increases the common PWM value by a first offset value.

10. The LED display driving device of claim 8, wherein, when the common PWM value is less than or equal to a reference value, the precalculator increases the common PWM value by a second offset value.

11. The LED display driving device of claim 8, wherein, when the common PWM value is less than or equal to a minimum value, the precalculator sets a minimum flag value to 1 and comprises the minimum flag value in the PWM control value.

12. A light emitting diode (LED) display device comprising:
    a data processing device configured to transmit image data comprising grayscale values of a plurality of pixels, each comprising an LED; and
    a driving device, configured to control grayscale of a pixel by distributing the grayscale to N subframes (N is a natural number of 2 or greater), comprising a memory configured to store the grayscale values of pixels, a plurality of channel circuits, each configured to perform pulse width modulation (PWM) control on power supplied to each pixel according to a PWM control value, and a precalculator configured to read K grayscale values at a time (K is a natural number), to calculate PWM control values in one subframe from the grayscale values, and to forward the PWM control values to the channel circuits
    wherein the precalculator comprises K sub-precalculators and each sub-precalculator calculates one PWM control value from one grayscale value and forwards the one PWM control value to one channel circuit.

13. The LED display device of claim 12, wherein the data processing device transmits option information comprising the number of the subframes to the driving device.

14. The LED display device of claim 12, wherein the data processing device transmits a communication clock along with the image data to the driving device and the driving device generates an internal clock by increasing the frequency of the communication clock by M (M is a natural number of 2 or greater) times.

* * * * *